(12) United States Patent
Hung et al.

(10) Patent No.: US 7,598,337 B2
(45) Date of Patent: Oct. 6, 2009

(54) MIXED-SULFONATION BLOCK COPOLYMERS

(75) Inventors: Joyce Hung, Niskayuna, NY (US); Hongyi Zhou, Niskayuna, NY (US); David Roger Moore, Albany, NY (US); Marianne Elisabeth Harmon, Niskayuna, NY (US); Daniel Joseph Brunelle, Burnt Hills, NY (US); Hongwei Liu, Troy, NY (US)

(73) Assignee: General Electric Company, Niskayuna, NY (US)

( * ) Notice: Subject to any disclaimer, the term of this patent is extended or adjusted under 35 U.S.C. 154(b) by 666 days.

(21) Appl. No.: 11/314,337

(22) Filed: Dec. 20, 2005

(65) Prior Publication Data
US 2007/0142613 A1    Jun. 21, 2007

(51) Int. Cl.
*C08G 2/00* (2006.01)
(52) U.S. Cl. .......................................... 528/220; 528/373
(58) Field of Classification Search .................. 528/373, 528/220
See application file for complete search history.

(56) References Cited

U.S. PATENT DOCUMENTS

2004/0186262 A1 * 9/2004 Maier et al. .................. 528/86
2004/0191602 A1 * 9/2004 Ishikawa et al. .............. 429/33

FOREIGN PATENT DOCUMENTS

| EP | 1113517 | A2 | 7/2001 |
| EP | 1681311 | A1 | 7/2006 |
| EP | 1449886 | A1 | 11/2007 |

OTHER PUBLICATIONS

"Characterization of Polymer Blends of Polyethersulfone/Sulfonated Polysulfone and Polyethersulfone/Sulfonated Polyetheretherketone for Direct Methanol Fuel Cell Applications", C. Manea, M. Mulder, Journal of Membrane Science 206 (2002) 443-453.
PCT International Search Report dated Oct. 19, 2007.
Roy et al., "Influence of Chemical Composition and Sequence Length on the Transport Properties of Proton Exchange Membranes", Journal of Polymer Science, Polymer Physics, vol. 44, pp. 2226-2239, 2006.

* cited by examiner

Primary Examiner—Randy Gulakowski
Assistant Examiner—Shane Fang
(74) Attorney, Agent, or Firm—Mary Louise Gioeni

(57) ABSTRACT

Sulfonated block copolymers that may be used as membranes for fuel cells include sulfonated polyaryletherketone blocks and lightly sulfonated polyethersulfone blocks.

The sulfonated polyaryletherketone blocks include structural units of formula

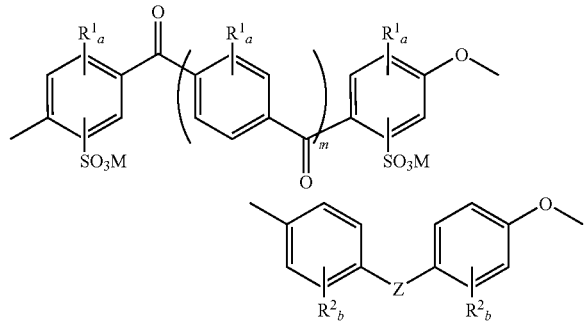

and the lightly sulfonated polyethersulfone blocks include structural units of formula

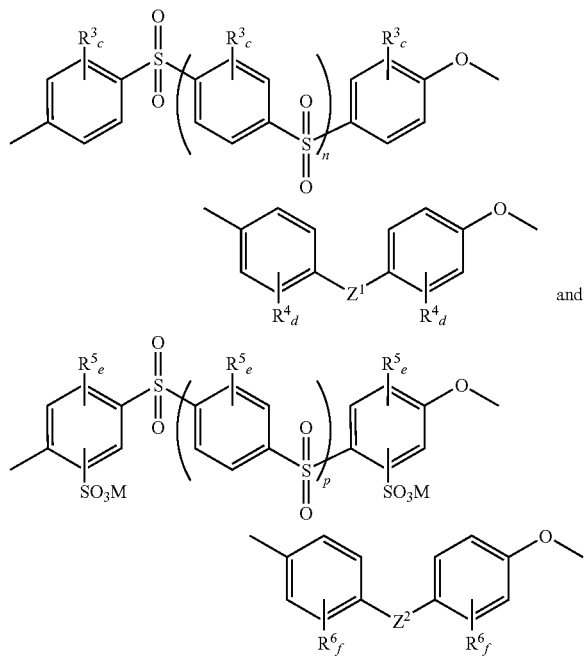

wherein
$R^1$, $R^2$, $R^3$, $R^4$, $R^5$ and $R^6$ are independently $C_1$-$C_{10}$ alkyl, $C_3$-$C_{12}$ cycloalkyl, $C_6$-$C_{14}$ aryl, allyl, alkenyl, alkoxy, halo, or cyano;
Z, $Z^1$ and $Z^2$ are independently a direct bond or O, S, $(CH_2)_r$, $(CF_2)_r$, $C(CH_3)_2$, $C(CF_3)_2$, or a combination thereof;
M is H, a metal cation, a non-metallic inorganic cation, an organic cation or a mixture thereof;
a and e are independently 0 or an integer from 1 to 3;
b, c, d, and f are independently 0 or an integer from 1 to 4;
m, n and p are independently 0 or 1; and
r is an integer from 1 to 5.

35 Claims, No Drawings

MIXED-SULFONATION BLOCK COPOLYMERS

BACKGROUND

The invention relates generally to mixed sulfonation polyaryletherketone-polyethersulfone block copolymers for use as proton exchange membranes.

Interest in using fuel cells as a clean, alternative power source has driven years of intense research in polymer electrolyte membrane (PEM) fuel cell development to meet the cost and performance targets for automotive and portable applications. Current PEM fuel cells use mainly Nafion® or other perfluorosulfonic acid polymer membranes which have high proton conductivity and good chemical and mechanical stability under fully humidified conditions. However, the widespread use of these membranes has been limited by their high cost and poor performance at low relative humidities (RH). Therefore, alternative low-cost membrane materials that have better performance in less humidified conditions are desired.

Both polyethersulfones (PES) and polyaryletherketones (PAEK) such as polyetheretherketones (PEEK) are known for their excellent chemical and mechanical properties. The presence of crystallinity in PAEK also imparts solvent resistance. Sulfonated PES and PAEK polymers have been studied extensively for PEM fuel cell membrane applications. Polyaryletherketones are easily sulfonated by treatment with concentrated sulfuric acid. Therefore sulfonated PAEK (SPAEK) polymers, particularly sulfonated polyetheretherketones (SPEEK), reported to date have mostly been synthesized by post-sulfonation. However, directly copolymerized SPEEK polymers have also been reported recently. While polymer blends of SPEEK/PES have been described (Manea, et al., *J. Membr. Sci.*, 206, 443-453 (2002)), block copolymers of SPEEK and (S)PES have not been reported.

BRIEF DESCRIPTION

It has been unexpectedly discovered that block copolymers of sulfonated polyetheretherketone and sulfonated polyethersulfone containing a combination of highly sulfonated blocks and lightly sulfonated blocks exhibit higher conductivities than corresponding sulfonated polyetheretherketone-polyethersulfone copolymers of the same ion exchange capacity, while water uptake does not increase significantly.

Accordingly, in one aspect, the present invention relates to sulfonated block copolymers that include sulfonated polyaryletherketone blocks and lightly sulfonated polyethersulfone blocks. The sulfonated polyaryletherketone blocks include structural units of formula

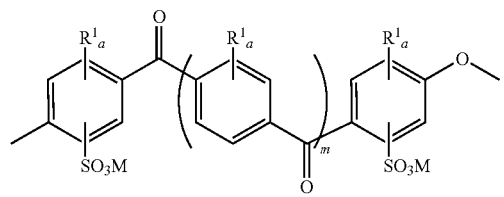

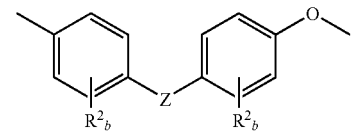

and the lightly sulfonated polyethersulfone blocks include structural units of formula

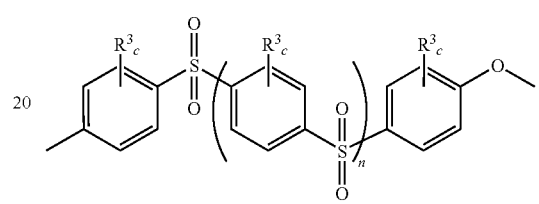

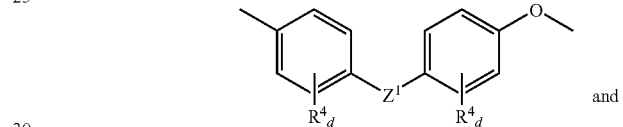
and

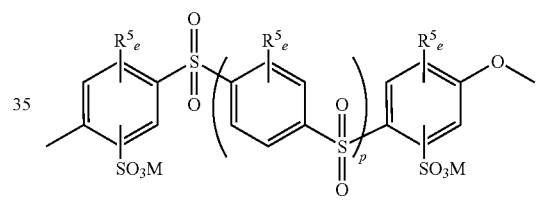

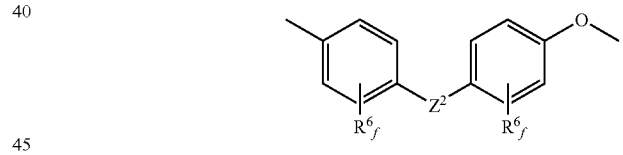

wherein
$R^1$, $R^2$, $R^3$, $R^4$, $R^5$ and $R^6$ are independently $C_1$-$C_{10}$ alkyl, $C_3$-$C_{12}$ cycloalkyl, $C_6$-$C_{14}$ aryl, allyl, alkenyl, alkoxy, halo, or cyano;

Z, $Z^1$ and $Z^2$ are independently a direct bond or O, S, $(CH_2)_r$, $(CF_2)_r$, $C(CH_3)_2$, $C(CF_3)_2$, or a combination thereof;

M is H, a metal cation, a non-metallic inorganic cation, an organic cation or a mixture thereof;

a and e are independently 0 or an integer from 1 to 3;

b, c, d, and f are independently 0 or an integer from 1 to 4; and m, n and p are independently 0 or 1; and r is an integer from 1 to 5.

In another aspect, the present invention relates to sulfonated block copolymers comprising structural units of formula VI, VII and VIII

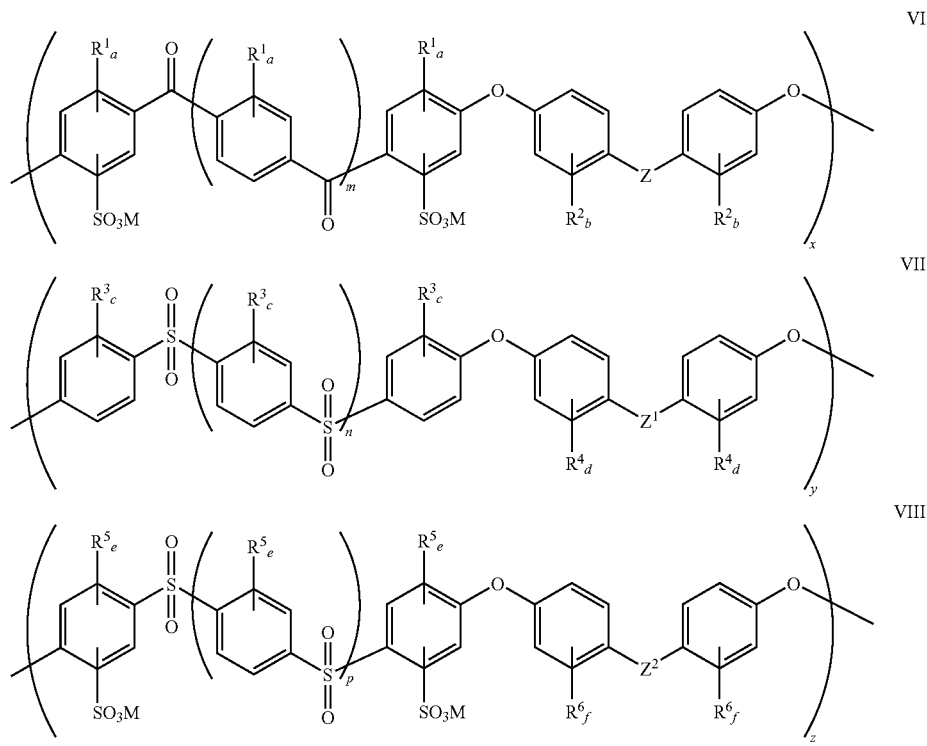

wherein
x ranges from about 1 to about 50;
(y+z) ranges from about 1 to about 100;
x/(x+y+z) ranges from about 0.2 to about 0.8; and
z/(y+z) ranges from about 0.1 to about 0.9.

In another aspect, the present invention relates to membranes comprising the sulfonated block copolymers, and to fuel cells containing those membranes.

DETAILED DESCRIPTION

In one embodiment, the present invention relates to sulfonated block copolymers comprising sulfonated polyaryletherketone blocks and polyethersulfone blocks. The sulfonated polyaryletherketone blocks include structural units of formula

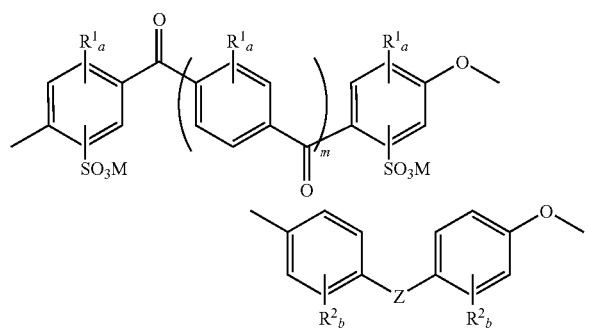

and the polyethersulfone blocks include structural units of formula

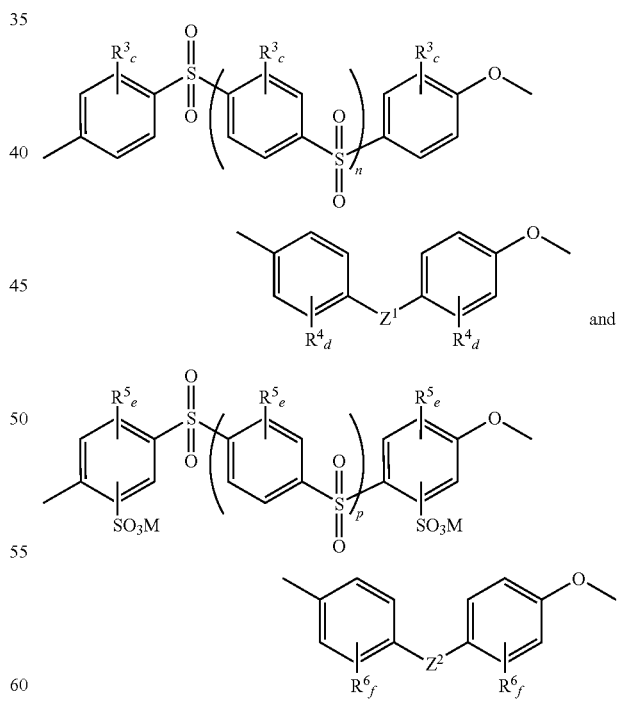

wherein
$R^1$, $R^2$, $R^3$, $R^4$, $R^5$ and $R^6$ are independently $C_1$-$C_{10}$ alkyl, $C_3$-$C_{12}$ cycloalkyl, $C_6$-$C_{14}$ aryl, allyl, alkenyl, alkoxy, halo, or cyano;

Z, $Z^1$ and $Z^2$ are independently a direct bond or O, S, $(CH_2)_r$, $(CF_2)_r$, $C(CH_3)_2$, $C(CF_3)_2$, or a combination thereof;

M is H, a metal cation, a non-metallic inorganic cation, an organic cation or a mixture thereof;

a and e are independently 0 or an integer from 1 to 3;

b, c, d, and f are independently 0 or an integer from 1 to 4;

m, n and p are independently 0 or 1; and r is an integer from 1 to 5.

In yet another embodiment, the present invention relates to sulfonated block copolymers comprising structural units of formula

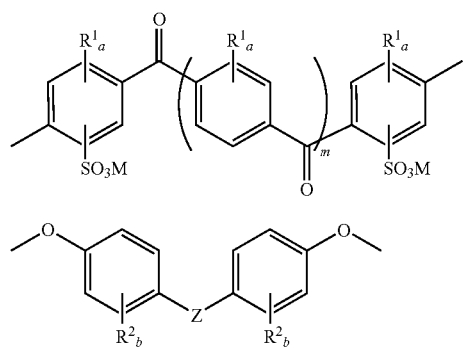

and polyethersulfone blocks comprising structural units of formula III, IV and V

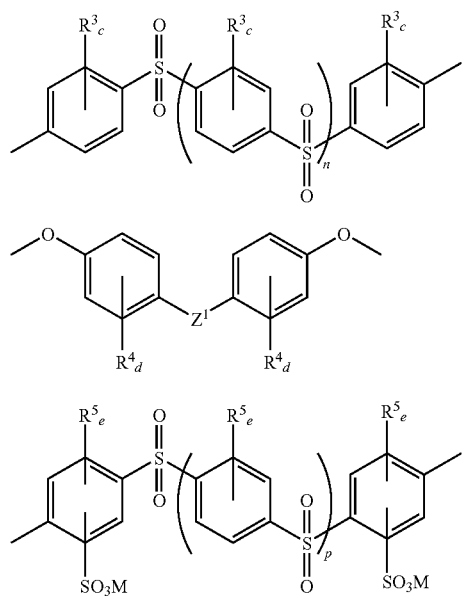

wherein variables are defined as above.

In particular embodiments, any of a, b, c, d, e or f may be 0. More particularly, all of a, b, c, and d are 0, and the block copolymer is composed of unsubstituted structural units, except for the sulfonate groups.

In separate embodiments, any or all of Z, $Z^1$ and $Z^2$ may be a direct bond or $C(CF_3)_2$ and the block copolymer is composed of structural units derived from 4,4'-(hexafluoroisopropylidene)diphenol (6F-bisphenol). In still other embodiments, all of Z, $Z^1$ and $Z^2$ are direct bonds, and the block copolymer is composed of structural units derived from biphenol monomers.

The sulfonated polyaryletherketone blocks are made up of structural units of formula I and II

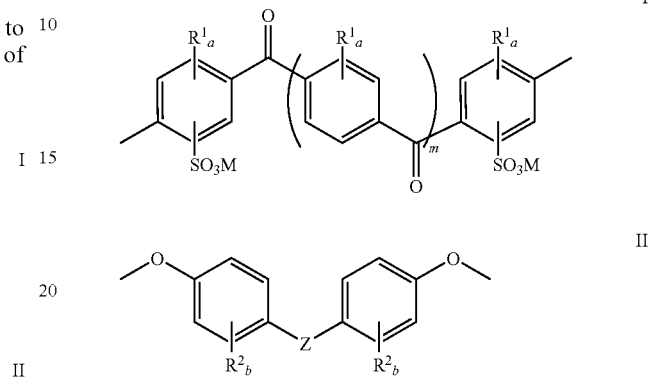

The SPAEK blocks are typically prepared by polycondensation of dihydroxyaryl monomers with sulfonated or unsulfonated dihalodiarylketones; alternately, condensation of sulfonated or unsulfonated dihalodiarylketone monomers, such as dichlorobenzophenone, with sulfonated or unsulfonated dihydroxydiarylketones, such as dihydroxybenzophenone may be used.

The units of formula I may be derived from one or more substituted or unsubstituted dihalobenzophenones such as 4,4'-difluorobenzophenone or 4,4'-dichlorobenzophenone, or from a di(halobenzoyl)benzene such as 1,4-bis(4-fluorobenzoyl)benzene or 1,4-bis(4-chlorobenzoyl)benzene. In a particular embodiment, a and m are 0, and the units of formula I are derived from an unsubstituted dihalobenzophenone. Sulfonated dihalodiarylketone monomers, particularly sulfonated dihalobenzophenone monomers, are typically used to prepare the sulfonated blocks, although the SPAEK blocks may be prepared by post-sulfonation if desired. Post-sulfonation means direct sulfonation of a non-sulfonated PAEK oligomer, using a sulfonating reagent such as $SO_3$, $ClSO_3H$, $Me_3SiSO_3Cl$, or fuming or concentrated $H_2SO_4$. The use of sulfonated monomers typically allows greater control of polymer architecture. Examples of suitable sulfonated dihalobenzophenone monomers include 4,4'-difluoro-3,3'-disulfonated-benzophenone sodium and potassium salts; 4,4'-dichloro-3,3'-disulfonated-benzophenone sodium and potassium salts; and 4,4'-difluorobenzophenone-3,3'-bis(sulfonic acid) and 4,4'-dichlorobenzophenone-3,3'-bis(sulfonic acid).

The structural units of formula II may be derived from one or more dihydroxyaryl monomers, particularly bisphenol monomers. The bisphenol monomers may be either symmetrical or unsymmetrical. Examples of suitable dihydroxyaryl monomers include bisphenols such as (4-hydroxyphenyl)methane, 2,2-bis(4-hydroxyphenyl)propane (also known as bisphenol-A), 4,4'-(hexafluoroisopropylidene) diphenol, 4,4'-biphenol, 2,2-bis(4-hydroxy-3,5-dibromophenyl)propane and 3,3'-dichloro-4,4'-dihydroxydiphenyl; dihydric phenol ethers such as bis(4-hydroxyphenyl)ether, bis(3, 5-dichloro-4-hydroxyphenyl)ether; bis(3,5-dibromo-4- hydroxyphenyl)ether; dihydroxy benzenes such as resorcinol, hydroquinone, halo- and alkyl-substituted dihydroxybenzenes such as 1,4-dihydroxy-2,5-dichlorobenzene, 1,4-dihydroxy-3-methylbenzene; dihydroxydiphenyl sulfides and sulfoxides such as bis(4-hydroxyphenyl)sulfide, bis (4-hydroxyphenyl)sulfoxide and bis(3,5-dibromo-4-hydroxyphenyl)sulfoxide. In a particular embodiment, Z is a direct bond and the units of formula II are derived from biphenol. In another embodiment, Z is $C(CF_3)_2$, and the units of formula II are derived from 4,4'-(hexafluoroisopropylidene)diphenol. A variety of dihydroxy-substituted aromatic hydrocarbons are available and are disclosed by name or formula (generic or specific) in U.S. Pat. No. 4,217,438.

The polyethersulfone blocks include structural units of formula III and IV

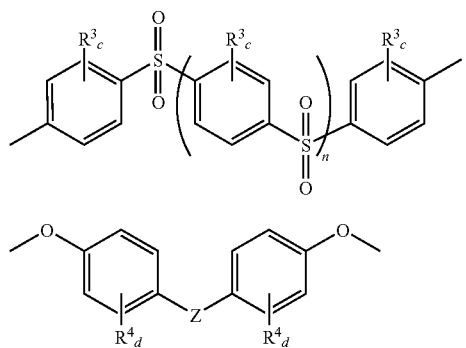

The lightly sulfonated PES blocks also contain units of formula V

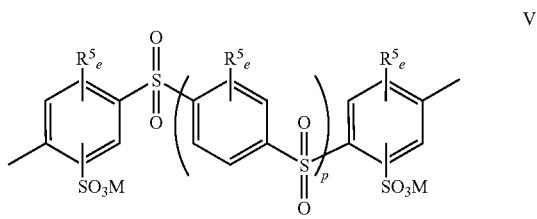

The lightly sulfonated PES blocks may be prepared by polycondensation of dihydroxyaryl monomers with dihalodiarylsulfones or polycondensation of dihalodiarylsulfone monomers, such as dichlorodiphenylsulfone, with dihydroxydiarylsulfones, such as dihydroxydiphenylsulfone. Examples of suitable dihalodiphenyl sulfones include 4,4'-dichlorodiphenylsulfone and 4,4'-difluorodiphenylsulfone. Examples of dihydroxyaryl monomers that are suitable for use in preparing the SPES blocks include those described above as suitable for use in preparing SPAEK blocks. Sulfonated dihalodiarylsulfone monomers, particularly dihalodiphenylsulfone monomers, are typically used to prepare the sulfonated polymers.

In another embodiment, the present invention relates to sulfonated block copolymers comprising structural units of formula VI, VII and VIII wherein
   x ranges from about 1 to about 50;
   (y+z) ranges from about 1 to about 100;
   x/(x+y+z) ranges from about 0.2 to about 0.8;
   z/(y+z) ranges from about 0.1 to about 0.9;
   and other variables are defined as above.

The sulfonated block copolymers typically contain from about 30 to about 80 mol % sulfonation, particularly from about 40 to about 60 mol % sulfonation, and more particularly from about 35 mol % to about 45 mol % sulfonation. The term "mol % sulfonation" means mol % of the structural units derived from a ketone or sulfone monomer and containing at least one sulfonate group, with respect to the total moles of structural units derived from ketone and sulfone monomers, and particularly refers to mol % of disulfonated structural units. That is, mol % sulfonation means the mol % of the total moles of structural units of formula I and V, with respect to the total moles of structural units of formula I, III and V, where the only structural units included in the block copolymers that are derived from ketone and/or sulfone monomers are the structural units of formula I, III, and V. For sulfonation levels less than about 30%, proton conductivity of the membranes is typically low, and for sulfonation levels greater than about 80%, swelling and water uptake are typically high. Length of the SPAEK blocks, x, ranges from about 1 to about 50, more particularly from about 20 to about 50, and most particularly from about 25 to about 45. Length of the PES blocks, y, ranges from about 1 to about 100, particularly from about 40 to about 70. Degree of sulfonation of the sulfonated block copolymers, (x+z)/(x+y+z) is typically controlled by the mol % of SPAEK block, x/(x+y+z), in combination with mol % of sulfonated sulfone in the SPES blocks, z/(x+y+z). The value of (x+z)/(x+y+z) ranges from about 0.4 to about 0.6, particularly from about 0.35 to about 0.45.

Weight average molecular weight ($M_w$) of the sulfonated block copolymers typically ranges from about 20,000 to about 200,000 Daltons, and particularly from about 100,000 to about 150,000 Daltons as measured by gel permeation chromatography in N,N-dimethyl-acetamide/LiBr using polyethylene oxide and polyethylene glycol standards. Total molecular weight of the sulfonated block copolymers is typically not critical, although higher molecular weights, that is, 100,000-150,000 Daltons, may be desirable in some embodiments.

The sulfonated block copolymers may be prepared by processes known in the art. These include nucleophilic displacement of stoichiometric quantities of bisphenolate salts with activated aromatic dihalides in polar aprotic solvents. In particular, the sulfonated block copolymers may be synthesized by nucleophilic aromatic substitution using potassium carbonate in dimethylsulfoxide (DMSO).

The polymers may also be prepared using phase transfer-catalyzed nucleophilic displacement of bisphenols with dihaloaryl monomers. Suitable phase transfer catalysts include hexaalkylguanidinium salts and bis-guanidinium salts. Typically the phase transfer catalyst comprises an anionic species such as halide, mesylate, tosylate, tetrafluoroborate, or acetate as the charge-balancing counterion(s). Suitable guanidinium salts include those disclosed in U.S. Pat. No. 5,132,423; U.S. Pat. No. 5,116,975 and U.S. Pat. No. 5,081,298. Other suitable phase transfer catalysts include p-dialkylamino-pyridinium salts, bis-dialkylaminopyridinium salts, bis-quaternary ammonium salts, bis-quaternary phosphonium salts, and phosphazenium salts. Suitable bis-quaternary ammonium and phosphonium salts are disclosed in U.S. Pat. No. 4,554,357. Suitable aminopyridinium salts are disclosed in U.S. Pat. No. 4,460,778; U.S. Pat. No. 4,513,141 and U.S. Pat. No. 4,681,949. Suitable phosphazenium salts are disclosed in U.S. patent application Ser. No. 10/950874. Additionally, in certain embodiments, the quaternary ammonium and phosphonium salts disclosed in U.S. Pat. No. 4,273,712 may also be used.

Either of the SPAEK or the PES blocks may be synthesized first, although it may be desirable to synthesize the SPAEK blocks first where the possibility of transetherification and scrambling to produce random copolymers of SPEEK and PES is of particular concern. Transetherification in the presence of fluoride anion and potassium carbonate may occur more readily in polyethersulfones than in polyetherketones, especially at temperatures greater than 200° C.

In separate embodiments, the present invention also relates to membranes, especially proton exchange or polymer electrolyte membranes, that include any of the sulfonated block copolymers according to the present invention, and to fuel cells that include the membranes.

DEFINITIONS

In the context of the present invention, alkyl is intended to include linear, branched, or cyclic hydrocarbon structures and combinations thereof, including lower alkyl and higher alkyl. Preferred alkyl groups are those of $C_{20}$ or below. Lower alkyl refers to alkyl groups of from 1 to 6 carbon atoms, preferably from 1 to 4 carbon atoms, and includes methyl, ethyl, n-propyl, isopropyl, and n-, s- and t-butyl. Higher alkyl refers to alkyl groups having seven or more carbon atoms, preferably 7-20 carbon atoms, and includes n-, s- and t-heptyl, octyl, and dodecyl. Cycloalkyl is a subset of alkyl and includes cyclic hydrocarbon groups of from 3 to 8 carbon atoms. Examples of cycloalkyl groups include cyclopropyl, cyclobutyl, cyclopentyl, and norbornyl.

Aryl and heteroaryl mean a 5- or 6-membered aromatic or heteroaromatic ring containing 0-4 heteroatoms selected from nitrogen, oxygen or sulfur; a bicyclic 9- or 10-membered aromatic or heteroaromatic ring system containing 0-4 heteroatoms selected from nitrogen, oxygen or sulfur; or a tricyclic 13- or 14-membered aromatic or heteroaromatic ring system containing 0-4 heteroatoms selected from nitrogen, oxygen or sulfur. The aromatic 6- to 14-membered carbocyclic rings include, for example, benzene, naphthalene, indane, tetralin, and fluorene; and the 5- to 10-membered aromatic heterocyclic rings include, e.g., imidazole, pyridine, indole, thiophene, benzopyranone, thiazole, furan, benzimidazole, quinoline, isoquinoline, quinoxaline, pyrimidine, pyrazine, tetrazole and pyrazole.

Arylalkyl means an alkyl residue attached to an aryl ring. Examples are benzyl and phenethyl. Heteroarylalkyl means an alkyl residue attached to a heteroaryl ring. Examples include pyridinylmethyl and pyrimidinylethyl. Alkylaryl means an aryl residue having one or more alkyl groups attached thereto. Examples are tolyl and mesityl.

Alkoxy or alkoxyl refers to groups of from 1 to 8 carbon atoms of a straight, branched, cyclic configuration and combinations thereof attached to the parent structure through an oxygen. Examples include methoxy, ethoxy, propoxy, isopropoxy, cyclopropyloxy, and cyclohexyloxy. Lower alkoxy refers to groups containing one to four carbons.

Acyl refers to groups of from 1 to 8 carbon atoms of a straight, branched, cyclic configuration, saturated, unsaturated and aromatic and combinations thereof, attached to the parent structure through a carbonyl functionality. One or more carbons in the acyl residue may be replaced by nitrogen, oxygen or sulfur as long as the point of attachment to the parent remains at the carbonyl. Examples include acetyl, benzoyl, propionyl, isobutyryl, t-butoxycarbonyl, and benzyloxycarbonyl. Lower-acyl refers to groups containing one to four carbons.

Heterocycle means a cycloalkyl or aryl residue in which one to four of the carbons is replaced by a heteroatom such as oxygen, nitrogen or sulfur. Examples of heterocycles that fall within the scope of the invention include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, and tetrahydrofuran, triazole, benzotriazole, and triazine.

Substituted refers to structural units, including, but not limited to, alkyl, alkylaryl, aryl, arylalkyl, and heteroaryl, wherein up to three H atoms of the residue are replaced with lower alkyl, substituted alkyl, aryl, substituted aryl, haloalkyl, alkoxy, carbonyl, carboxy, carboxalkoxy, carboxamido, acyloxy, amidino, nitro, halo, hydroxy, $OCH(COOH)_2$, cyano, primary amino, secondary amino, acylamino, alkylthio, sulfoxide, sulfone, phenyl, benzyl, phenoxy, benzyloxy, heteroaryl, or heteroaryloxy; each of said phenyl, benzyl, phenoxy, benzyloxy, heteroaryl, and heteroaryloxy is optionally substituted with 1-3 substituents selected from lower alkyl, alkenyl, alkynyl, halogen, hydroxy, haloalkyl, alkoxy, cyano, phenyl, benzyl, benzyloxy, carboxamido, heteroaryl, heteroaryloxy, nitro or —NRR (wherein R is independently H, lower alkyl or cycloalkyl, and —RR may be fused to form a cyclic ring with nitrogen).

Haloalkyl refers to an alkyl residue, wherein one or more H atoms are replaced by halogen atoms; the term haloalkyl includes perhaloalkyl. Examples of haloalkyl groups that fall within the scope of the invention include $CH_2F$, $CHF_2$, and $CF_3$.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

EXAMPLES

The mixed sulfonation block copolymers of polyetheretherketone-polyethersulfones (SPEEK-SPES) were synthesized by nucleophilic aromatic substitution using the potassium carbonate method in dimethylsulfoxide (DMSO). The 100% sulfonated polyetheretherketone oligomer with phenoxide end groups was first synthesized by adding 3,3'-disulfonated 4,4'-difluorobenzophenone and excess 4,4'-biphenol (Scheme 1). The molecular weight of the oligomer was controlled by the degree of excess biphenol. Then 3,3'-disulfonated 4,4'-difluorodiphenylsulfone, 4,4'-difluorodiphenylsulfone, and 4,4'-biphenol were added to the reaction to form the sulfonated polyethersulfone blocks. The degree of sulfonation in this block was adjusted by the amount of sulfonated sulfone monomer added and was kept below 30 mol % to avoid significant additional water uptake.

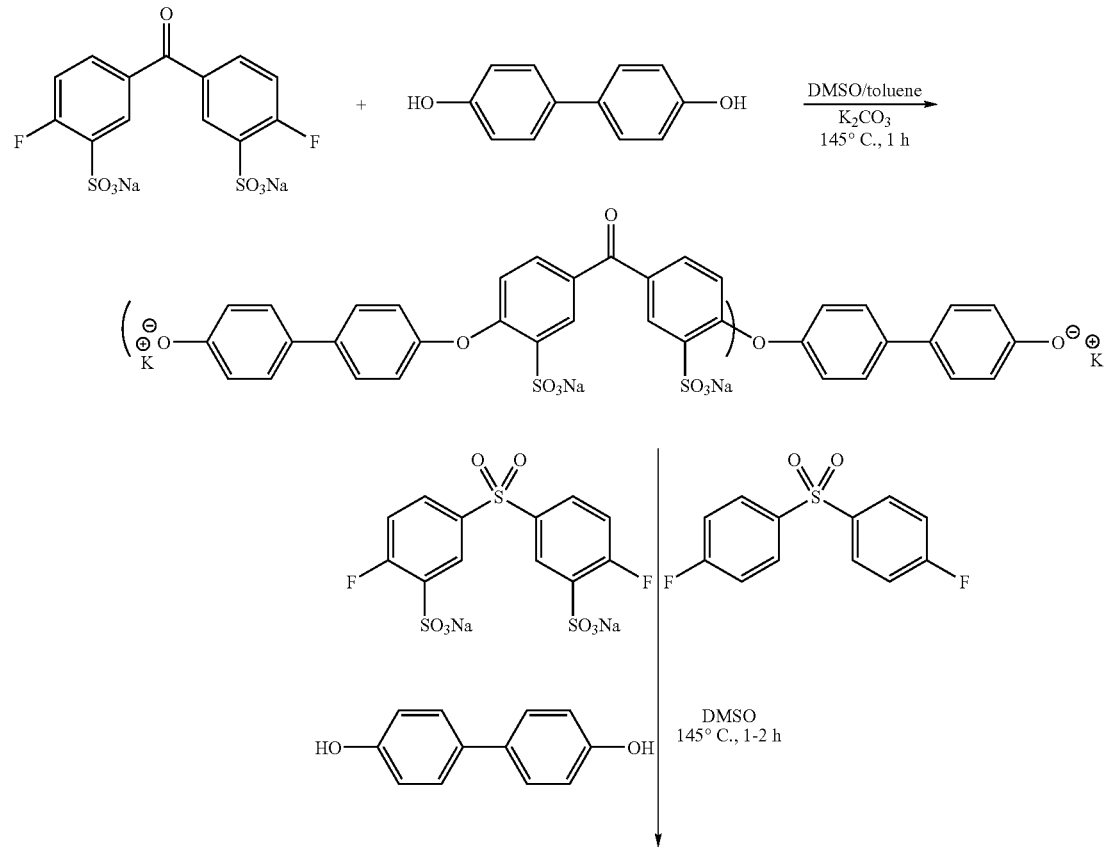

Scheme 1

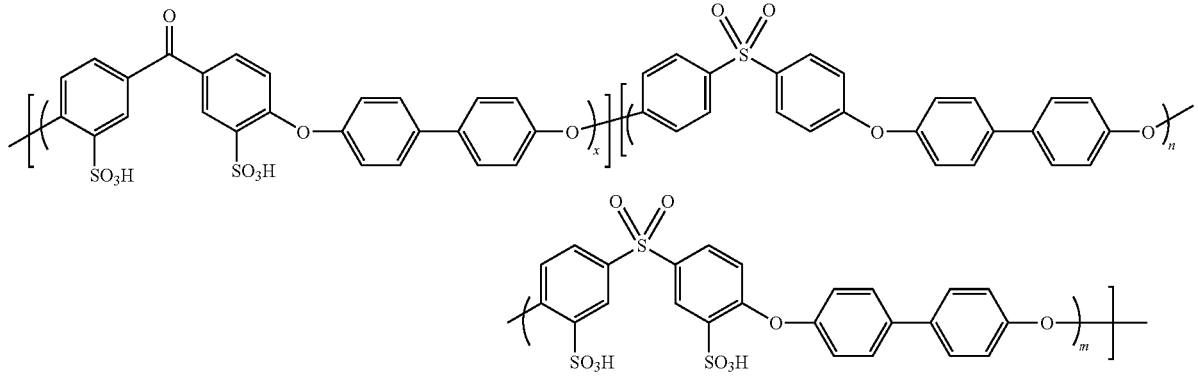

-continued

The overall degree of sulfonation was calculated as follows:

% SO₃H=[(mole fraction SPEEK)×100%]+[(mole fraction SPES)×(% SO₃H SPES)]

Example 1

Synthesis of Sulfonated Polyetheretherketone-Sulfonated Polyethersulfone Block Copolymers Monomers and potassium carbonate were dried and stored in a nitrogen purge box. Toluene was dried over activated molecular sieves. All other chemicals were used as received.

The length of the SPEEK block was adjusted by the stoichiometry of sulfonated difluorobenzophenone and 4,4'-biphenol. The total degree of sulfonation was adjusted by the ratio of SPEEK:SPES block length and also by the ratio of sulfonated:non-sulfonated sulfone monomers in the SPES block. Sulfonated difluorobenzophenone (1 g, 2.37 mmol), 4,4'-biphenol (0.529 g, 2.84 mmol), and K₂CO₃ (1.227 g, 8.88 mmol) were transferred into a three-neck flask connected to a Dean-Stark trap/condenser, nitrogen inlet, and mechanical stirrer. DMSO (4 mL) and toluene (3 mL) were added. The mixture was stirred at 145° C. for 1 hour. 4,4'-Difluorodiphenylsulfone (0.722 g, 2.84 mmol), sulfonated difluorodiphenylsulfone (0.326 g, 0.71 mmol), 4,4'-biphenol (0.573 g, 3.08 mmol), DMSO (3.5 mL) and toluene (1 mL) were added. The mixture was stirred at 145° C. for 30 minutes. The viscous solution was diluted with DMSO (7.5 mL) and stirred at 145° C. for another 30 minutes until the solution became viscous again. The mixture was diluted with DMSO (20 mL) and poured into stirring isopropanol. The polymer was isolated, dried under vacuum briefly, and washed/soaked in deionized water until the washings were pH neutral. The polymer was dried under vacuum at 100° C.

The compositions of the SPEEK-SPES block copolymers are listed in Table 1. The 50% (JH86) and 60% (JH92) sulfonated SPEEK-PES block copolymers are included for comparison. Mixed sulfonation block copolymer JH112 has a theoretical ion-exchange capacity (IEC) similar to that of the 50% sulfonated SPEEK-PES block copolymer.

TABLE 1

Compositions of SPEEK-SPES block copolymers

| Sample | SPEEK block DP | Mole fraction SPEEK | Mole fraction SPES | % SO₃H [SPES] | Overall % SO₃H | IEC (meq/g) |
|---|---|---|---|---|---|---|
| JH112 | 5 | 0.4 | 0.6 | 20 | 52 | 2.2 |
| JH86 * | 5 | 0.5 | 0.5 | 0 | 50 | 2.2 |
| JH92 * | 5 | 0.6 | 0.4 | 0 | 60 | 2.5 |
| JH121 | 5 | 30 | 70 | 15 | 40.5 | 1.8 |
| JH122 | 5 | 30 | 70 | 30 | 51 | 2.2 |
| JH123 | 5 | 40 | 60 | 15 | 49 | 2.1 |
| JH124 | 5 | 40 | 60 | 30 | 58 | 2.4 |
| JH125 | 10 | 30 | 70 | 15 | 40.5 | 1.8 |
| JH127 | 10 | 30 | 70 | 30 | 51 | 2.2 |
| JH128 | 10 | 40 | 60 | 15 | 49 | 2.1 |
| JH129 | 10 | 40 | 60 | 30 | 58 | 2.4 |
| JH126-F | 5 | 40 | 60 | 20 | 52 | 2.1 |
| JH130-F | 10 | 40 | 60 | 20 | 52 | 2.1 |
| JH142-F | 25 | 40 | 60 | 20 | 52 | 2.1 |

* SPEEK-PES block copolymers for comparison

Example 2

Membrane Preparation

The polymers were cast onto a glass plate from 10 wt % solutions in DMSO using a doctor blade (20 mil). The films were dried at 50° C. for 3 hours and then under vacuum at 100° C. for 24 hours. Acidification of the films was achieved by soaking in 1M H₂SO₄ at room temperature for 24 hours, followed by soaking in deionized water for 6 hours.

Example 3

Membrane Proton Conductivity Measurement

The proton conductivity of the polymer membranes was determined by 4-electrode impedance measurements at various temperatures and relative humidities. Measurements used a Parstat impedance analyzer with PowerSine software, using a signal amplitude that ranged from 5 to 50 mV and frequencies ranging from 2 Hz to 2 MHz. The sample dimensions varied between samples, with a typical sample being 1.5 cm×2.5 cm and having a thicknesses ranging from 20 to 100 μm. Typical membranes were 25-50 μm in thickness. The proton conductivities of the block copolymers at various temperatures and relative humidities are listed in Tables 2-4.

TABLE 2

Comparison of conductivity of mixed-sulfonation SPEEK-SPES block copolymers with SPEEK-PES block copolymers

| Temp. | | Conductivity (S/cm) | | |
|---|---|---|---|---|
| (° C.) | RH (%) | JH112 | JH86* | JH92* |
| 20 | 100 | 0.0727 | 0.0593 | 0.0996 |
| 60 | 50 | 0.0034 | 0.0015 | 0.0094 |
| 80 | 25 | 0.0016 | 0.0006 | 0.0018 |
| 80 | 50 | 0.0066 | 0.0030 | 0.0107 |
| 80 | 75 | 0.0242 | 0.0199 | 0.0209 |
| 80 | 100 | 0.0865 | 0.1005 | 0.0675 |
| 100 | 50 | 0.0088 | 0.0032 | 0.0079 |
| 100 | 75 | 0.0213 | 0.0181 | 0.0263 |
| 120 | 50 | 0.0036 | 0.0027 | 0.0042 |

*SPEEK-PES block copolymers for comparison

TABLE 3

Proton conductivities of mixed-sulfonation SPEEK-SPES block copolymers

| Temp. | | Conductivity (S/cm) | | | | | | | |
|---|---|---|---|---|---|---|---|---|---|
| (° C.) | RH (%) | JH121 | JH122 | JH123 | JH124 | JH125 | JH127 | JH128 | JH129 |
| 20 | 100 | 0.0727 | 0.0593 | 0.0996 | 0.0875 | 0.0515 | 0.0797 | 0.0765 | 0.0527 |
| 60 | 50 | 0.0034 | 0.0015 | 0.0094 | 0.0239 | 0.0005 | 0.0050 | 0.0009 | 0.0021 |
| 80 | 25 | 0.0016 | 0.0006 | 0.0018 | 0.0002 | 0.0006 | 0.0014 | 0.0008 | 0.0002 |
| 80 | 50 | 0.0066 | 0.0030 | 0.0107 | 0.0054 | 0.0036 | 0.0083 | 0.0020 | 0.0037 |
| 80 | 75 | 0.0242 | 0.0199 | 0.0209 | 0.0127 | 0.0175 | 0.0216 | 0.0257 | 0.0152 |
| 80 | 100 | 0.0865 | 0.1005 | 0.0675 | 0.0217 | 0.0856 | 0.0657 | 0.0530 | 0.0402 |
| 100 | 50 | 0.0088 | 0.0032 | 0.0079 | 0.0022 | 0.0022 | 0.0041 | 0.0053 | 0.0031 |
| 100 | 75 | 0.0213 | 0.0181 | 0.0263 | 0.0212 | 0.0056 | 0.0197 | 0.0200 | 0.0196 |
| 120 | 50 | 0.0036 | 0.0027 | 0.0042 | 0.0031 | 0.0027 | 0.0031 | 0.0039 | 0.0038 |

TABLE 4

Proton conductivities of partially fluorinated mixed-sulfonation SPEEK-SPES block copolymers

| Temp. | | Conductivity (S/cm) | | |
|---|---|---|---|---|
| (° C.) | RH (%) | JH126-F | JH130-F | JH142-F |
| 20 | 100 | 0.0767 | 0.0679 | 0.0850 |
| 60 | 50 | 0.0038 | 0.0037 | 0.0072 |
| 80 | 25 | 0.0012 | 0.0014 | 0.0028 |
| 80 | 50 | 0.0062 | 0.0053 | 0.0059 |
| 80 | 75 | 0.0164 | 0.0148 | 0.0240 |
| 80 | 100 | 0.0366 | 0.0900 | 0.0950 |
| 100 | 50 | 0.0065 | 0.0053 | 0.0074 |
| 100 | 75 | 0.0190 | 0.0176 | 0.0250 |
| 120 | 50 | 0.0015 | 0.0024 | 0.0048 |

As shown in Tables 2, 3 and 4, the proton conductivity of JH112 was higher than that of the similar IEC copolymer (JH86), especially at relative humidities of 25-50%, and similar to that of the higher IEC copolymer (JH92). Several compositions yielded similar desirable conductivity profiles: JH112, JH125, JH127, JH126-F, JH130-F, and JH142-F. This indicates that there was better connectivity between the ionic domains in the mixed sulfonation block copolymer, resulting in more efficient use of the sulfonic acid groups. The partially fluorinated SPEEK-SPES block copolymers (JH126-F, JH130-F, and JH142-F) had a desirable balance of proton conductivity and water uptake. Increase in the SPEEK block length improved the proton conductivity at 80° C., 25% RH. In contrast to the SPEEK-PES block copolymers, the solvent cast mixed sulfonation block copolymer membranes were homogeneous and optically clear for all block lengths.

Example 4

Membrane Water Uptake Measurement

Membrane water uptake was determined using a thin film sample with a nominal area of ca. 20×20 mm$^2$. The sample film was first dried in a vacuum oven at 110° C. for 2 hours and then immediately weighed with a microbalance to obtain its dry weight. The film was then soaked for 2 hours in deionized water at various temperatures (room temperature, 60° C., 90° C., and boiling.) After soaking, the film was taken out, quickly patted dry to remove any surface water droplets, and then immediately weighed to obtain the sample weight after soaking. Water uptake is expressed as the percent increase in weight of the sample relative to the weight of the vacuum dried sample and was calculated according to the following equation:

Water Uptake=[weight (wet)−weight (dry)]/[weight (dry)]×100%

The water uptake of the mixed sulfonation block copolymer (JH112) was similar to that of the 50% sulfonated polymer (JH86) and lower than that of the 60% sulfonated polymer (JH92). This indicates that improving the connectivity of ionic domains can lead to an increase in the proton conductivity without affecting the water uptake. Partial fluorination of the SPES block reduced water uptake even further.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A sulfonated block copolymer comprising
sulfonated polyaryletherketone blocks comprising structural units of formula

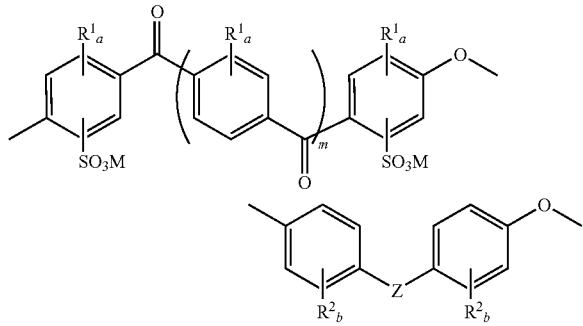

and polyethersulfone blocks comprising structural units of formula

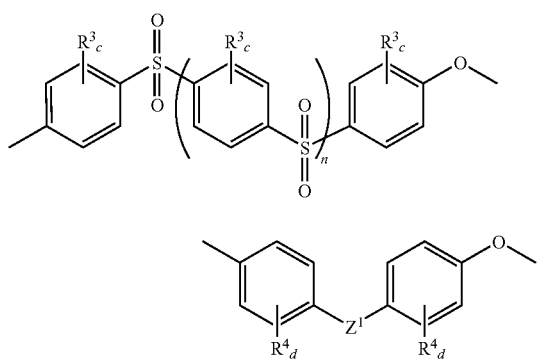

and

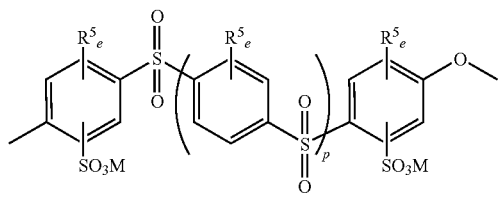

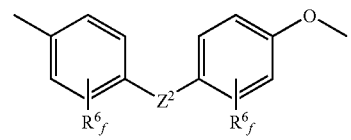

wherein
$R^1$, $R^2$, $R^3$, $R^4$, $R^5$ and $R^6$ are independently $C_1$-$C_{10}$ alkyl, $C_3$-$C_{12}$ cycloalkyl, $C_6$-$C_{14}$ aryl, allyl, alkenyl, alkoxy, halo, or cyano;
Z, $Z^1$ and $Z^2$ are independently a direct bond or O, S, $(CH_2)_r$, $(CF_2)_r$, $C(CH_3)_2$, $C(CF_3)_2$, or a combination thereof;
M is H, a metal cation, a non-metallic inorganic cation, an organic cation or a mixture thereof;
a and e are independently 0 or an integer from 1 to 3;
b, c, d, and f are independently 0 or an integer from 1 to 4;
m, n and p are independently 0 or 1; and
r is an integer from 1 to 5.

2. A sulfonated block copolymer according to claim 1, wherein a is 0.

3. A sulfonated block copolymer according to claim 1, wherein b is 0.

4. A sulfonated block copolymer according to claim 1, wherein c is 0.

5. A sulfonated block copolymer according to claim 1, wherein d is 0.

6. A sulfonated block copolymer according to claim 1, wherein e is 0.

7. A sulfonated block copolymer according to claim 1, wherein f is 0.

8. A sulfonated block copolymer according to claim 1, wherein m is 0.

9. A sulfonated block copolymer according to claim 1, wherein n is 0.

10. A sulfonated block copolymer according to claim 1, wherein Z is a direct bond.

11. A sulfonated block copolymer according to claim 1, wherein $Z^1$ is a direct bond.

12. A sulfonated block copolymer according to claim 1, wherein $Z^2$ is a direct bond.

13. A sulfonated block copolymer according to claim 1, wherein at least one of Z, $Z^1$ and $Z^2$ is $C(CF_3)_2$.

14. A sulfonated block copolymer comprising structural units of formula VI, VII and VIII

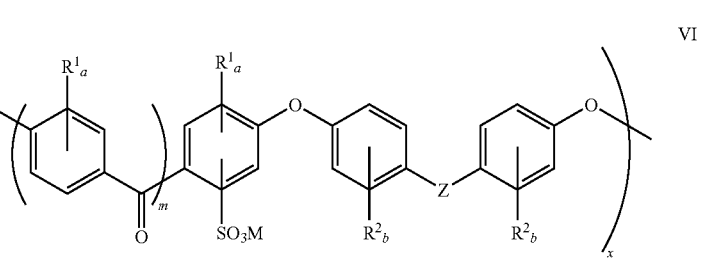

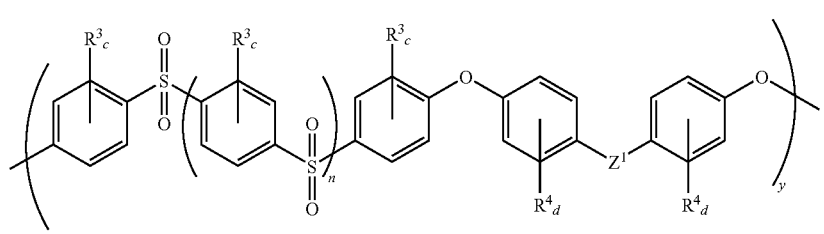

VII

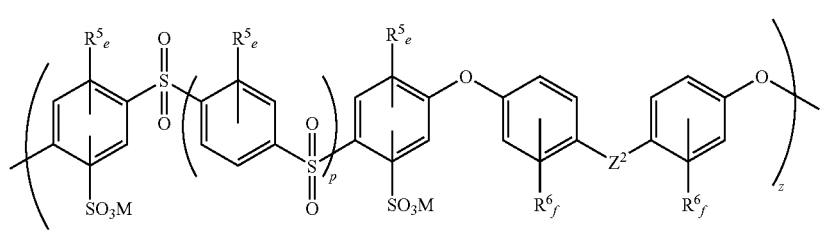

VIII wherein
$R^1$, $R^2$, $R^3$, $R^4$, $R^5$ and $R^6$ are independently $C_1$-$C_{10}$alkyl, $C_3$-$C_{12}$ cycloalkyl, $C_6$-$C_{14}$ aryl, allyl, alkenyl, alkoxy, halo, or cyano;

Z, $Z^1$ and $Z^2$ are independently a direct bond or O, S, $(CH_2)_r$, $(CF_2)_r$, $C(CH_3)_2$, $C(CF_3)_2$, or a combination thereof;

M is H, a metal cation, a non-metallic inorganic cation, an organic cation or a mixture thereof;

a and e are independently 0 or an integer from 1 to 3;

b, c, d, and f are independently 0 or an integer from 1 to 4; and m, n and p are independently 0 or 1;

r is an integer from 1 to 5;

x ranges from about 1 to about 50;

(y+z) ranges from about 1 to about 100;

x/(x+y+z) ranges from about 0.2 to about 0.8; and z/(y+z) ranges from about 0.1 to about 0.9.

15. A sulfonated block copolymer according to claim 14, wherein a is 0.

16. A sulfonated block copolymer according to claim 14, wherein b is 0.

17. A sulfonated block copolymer according to claim 14, wherein c is 0.

18. A sulfonated block copolymer according to claim 14, wherein d is 0.

19. A sulfonated block copolymer according to claim 14, wherein e is 0.

20. A sulfonated block copolymer according to claim 14, wherein f is 0.

21. A sulfonated block copolymer according to claim 14, wherein m is 0.

22. A sulfonated block copolymer according to claim 14, wherein n is 0.

23. A sulfonated block copolymer according to claim 14, wherein Z is a direct bond.

24. A sulfonated block copolymer according to claim 14, wherein $Z^1$ is a direct bond.

25. A sulfonated block copolymer according to claim 1, wherein $Z^2$ is a direct bond.

26. A sulfonated block copolymer according to claim 14, wherein at least one of Z, $Z^1$, and $Z^2$ is $C(CF_3)_2$.

27. A sulfonated block copolymer according to claim 14, wherein x ranges from about 5 to about 50.

28. A sulfonated block copolymer according to claim 14, wherein x ranges from about 25 to about 45.

29. A sulfonated block copolymer according to claim 14, wherein (y+z) ranges from about 40 to about 70.

30. A sulfonated block copolymer according to claim 14, wherein (x+z)/(x+y+z) ranges from about 0.4 to about 0.6.

31. A sulfonated block copolymer according to claim 14, wherein (x+z)/(x+y+z) ranges from about 0.35 to about 0.45.

32. A sulfonated block copolymer according to claim 14, wherein z/(y+z) ranges from about 0.1 to 0.5.

33. A sulfonated block copolymer according to claim 14, wherein z/(y+z) ranges from about 0.15 to 0.35.

34. A membrane comprising a sulfonated block copolymer according to claim 1.

35. A fuel cell comprising a membrane according to claim 34.

* * * * *

UNITED STATES PATENT AND TRADEMARK OFFICE
CERTIFICATE OF CORRECTION

PATENT NO.       : 7,598,337 B2                                Page 1 of 1
APPLICATION NO. : 11/314337
DATED            : October 6, 2009
INVENTOR(S)      : Hung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 956 days.

Signed and Sealed this

Twenty-eighth Day of September, 2010

David J. Kappos
*Director of the United States Patent and Trademark Office*